June 28, 1938.   J. R. MORRIS   2,122,261
CUTTING APPARATUS
Filed Sept. 12, 1936
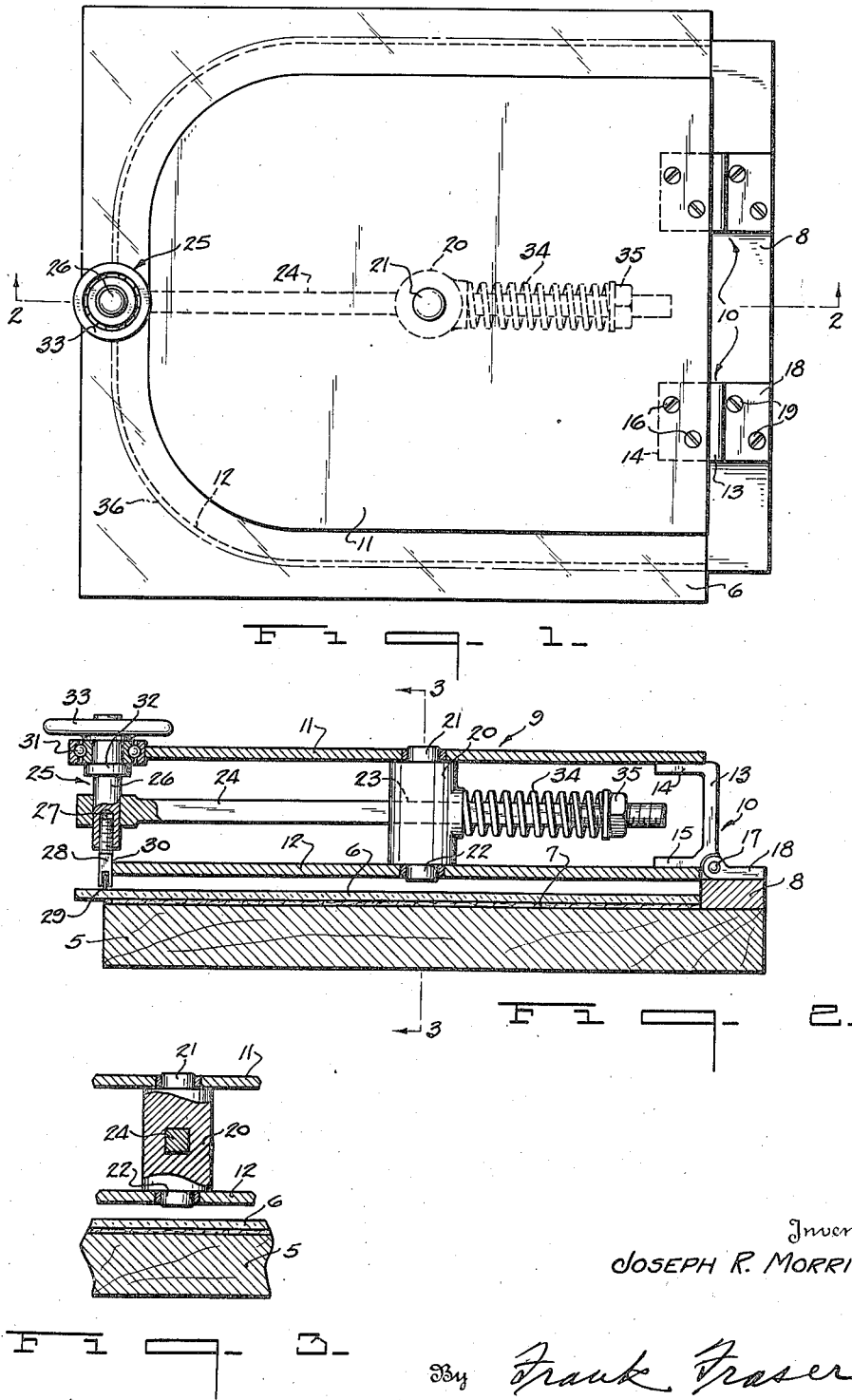
Inventor
JOSEPH R. MORRIS.
By Frank Fraser
Attorney Patented June 28, 1938

2,122,261

UNITED STATES PATENT OFFICE 2,122,261

CUTTING APPARATUS

Joseph R. Morris, Toledo, Ohio, assignor to Libbey-Owens-Ford Glass Company, Toledo, Ohio, a corporation of Ohio Application September 12, 1936, Serial No. 100,527

8 Claims. (Cl. 33—27)

This invention relates to improvements in cutting apparatus generally and more particularly to an apparatus designed primarily for the cutting of glass sheets or plates although it is of course not restricted to such use.

One of the objects of the invention is the provision of an apparatus of simple, compact construction for cutting glass sheets or plates to exact shapes and sizes and which does not require the skill of hand cutting.

Another object of the invention is the provision of an apparatus capable of cutting curves of both small and large radius rapidly and accurately and which permits the snapping or cracking off operation to be performed without necessitating the removal of the sheet from the support on which it is cut.

The apparatus is of particular utility in cutting sheets of relatively thin glass which is to be used in making safety glass and wherein it is highly desirable that the pairs of glass sheets which enter into each plate of safety glass shall be of precisely the same shape and size. By the use of the apparatus here provided, the uniform cutting of successive sheets of glass will be assured.

Other objects and advantages of the invention will become more apparent during the course of the following description when taken in connection with the accompanying drawing.

In the drawing wherein like numerals are employed to designate like parts throughout the same, Fig. 1 is a plan view of cutting apparatus constructed in accordance with the present invention;

Fig. 2 is a longitudinal vertical sectional view taken substantially on line 2—2 of Fig. 1; and Fig. 3 is a detail vertical sectional view taken substantially on line 3—3 of Fig. 2.

The embodiment of the invention illustrated in the drawing comprises a table or other suitable support 5 for supporting the glass sheet 6 which is to be cut, the upper surface of said support being preferably covered with a pad 7 of felt or heavy cloth upon which the glass sheet is laid.

The support 5 is preferably substantially rectangular and has secured to its upper surface along one edge thereof a wooden strip 8 to which the cutting apparatus, designated in its entirety by the numeral 9, is pivotally secured by means of spaced hinges 10.

The cutting apparatus 9 includes a pair of spaced, superimposed template plates 11 and 12 having the exact contour to which the glass sheet 6 is to be cut, with the lower template plate being slightly less in size while the upper template plate is somewhat smaller than the lower template plate for a purpose which will be later on apparent. The template plates 11 and 12 are carried by the sections 13 of hinges 10 and to this end the said hinge sections are provided with the forwardly projecting horizontal flanges 14 and 15 to which the template plates 11 and 12 are respectively secured by screws or the like 16. The hinge sections 13 are pivotally connected at 17 to the hinge sections 18 which are secured to the wooden strip 8 by screws or the like 19. With this construction it will be seen that the template plates 11 and 12 can be swung upwardly as a unit about pivot points 17 to permit the positioning of a glass sheet to be cut upon the support as well as the removal of the cut sheet therefrom.

Arranged between the template plates 11 and 12 at substantially the central point thereof is a block 20 provided at its upper and lower ends with trunnions 21 and 22 which pass loosely through the said template plates and by means of which the block is swiveled thereto. The block 20 is formed with a horizontal rectangular opening 23 and loosely inserted through said opening is a guide bar 24 carrying at its forward end the glass cutting unit 25.

The cutting unit 25 comprises a short vertical sleeve 26 passing loosely through the outer end of the guide bar 24 and provided in its lower end with an opening 27 in which is threaded the cutter holder 28 carrying the glass cutting or scoring tool here shown as consisting of a rotatable steel wheel 29. The lower portion of the cutter holder is provided with a flat inner face 30 engaging the edge of the template plate 12 and by means of which the said cutting tool is prevented from rotating about an axis perpendicular to the plane of the glass sheet.

Carried at the upper end of the vertical sleeve 26 is an anti-friction means 31 engaging the edge of the template plate 11 to facilitate swinging movement of the guide bar 24 as well as assisting in maintaining the cutting tool 29 in a vertical position. The anti-friction means 31 comprises a roller bearing supported upon a flange 32 formed on the sleeve 26 and held in place by a nut 33 which also serves as a hand grip for the operator. It is due to the provision of the roller bearing 31, that the upper template plate is made relatively smaller than the lower template plate.

Encircling the guide bar 24, inwardly of the block 20, is a compression spring 34 held upon said bar by a nut 35, said spring acting to draw the guide bar inwardly to hold the roller bearing 31 and cutter holder 28 in yieldable engagement respectively with the edges of the upper and lower template plates 11 and 12.

In using the apparatus, the template plates 11 and 12 and cutting unit 25 carried thereby are first swung upwardly on the hinges 10 to permit the placing of a glass sheet 6 to be cut upon the support 5, the rear edge of the sheet being butted against the wooden strip 8 which acts as a straight edge. The template plates and cutting unit are then lowered and in order to make the cut, it is simply necessary for the operator to swing the guide bar 24 about the pivotal point of the block 20. Due to the provision of the compression spring 34, the cutter holder 28 is maintained in yielding engagement with the edge of the template plate 12. However, the guide bar 24 is permitted to move freely inwardly and outwardly relative to the block 20 during the swinging thereof so that the cutting tool can follow the contour of the template plate to effect the scoring of the glass sheet as indicated by the numeral 36.

During the swinging of the guide bar 24, the cutter holder will always be maintained in the same relation with respect to the glass sheet and with respect to the edge of the template plate. Thus, when using a cutter wheel such as shown in the drawing, the axis of rotation of the wheel will be at all times at right angles to the direction in which the cutter is being moved so that the cutting edge of the wheel will remain tangent to the line of cut throughout the cutting operation. Consequently, no particular skill is necessary in using the apparatus and since all that is necessary for cutting is the swinging of the guide bar, the glass sheets may be cut very rapidly. After the cutting operation, the cutting mechanism can be swung upwardly and the glass sheet can be broken by the operator along the score line 36 while resting upon the support and before being removed therefrom. The scoring and cracking off operations can therefore be accomplished both rapidly and conveniently and, in addition, the sheet can be cut to an exact shape and size. Furthermore, the uniform cutting of successive sheets will be assured so that when used in the making of safety glass, the pairs of sheets will match perfectly.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus of the character described for cutting glass sheets, a horizontal support for the sheet to be cut, a pair of spaced superimposed template plates mounted horizontally above said support, a guide member arranged between and pivotally carried by said template plates to turn about a vertical axis and also mounted for horizontal sliding movement, a cutting unit carried by said guide member and including a scoring tool, and spring means for maintaining the cutting unit in yieldable engagement with the edges of the template plates.

2. In apparatus of the character described for cutting glass sheets, a horizontal support for the sheet to be cut, a pair of spaced superimposed template plates mounted horizontally above said support, a member arranged between and pivotally carried by said template plates, a horizontal guide bar slidably carried by said member, a cutting unit carried by said guide bar and including a scoring tool, and spring means for maintaining the cutting unit in yieldable engagement with the edges of the template plates.

3. In apparatus of the character described for cutting glass sheets, a horizontal support for the sheet to be cut, a pair of spaced superimposed template plates mounted horizontally above said support, a block disposed between and pivotally carried by said template plates, a horizontal guide bar passing loosely through said block, a cutting unit carried at the outer end of said guide bar and including a scoring tool, and means for maintaining the cutting unit in yieldable engagement with the edges of the template plates.

4. In apparatus of the character described for cutting glass sheets, a horizontal support for the sheet to be cut, a pair of spaced superimposed template plates mounted horizontally above said support, a block disposed between and pivotally carried by said template plates, a horizontal guide bar passing loosely through said block, a cutting unit carried at the outer end of said guide bar and including a scoring tool, and a spring encircling the guide bar and acting to draw the said bar inwardly to hold the cutting unit in yieldable engagement with the edges of the template plates.

5. In apparatus of the character described for cutting glass sheets, a horizontal support for the sheet to be cut, a pair of spaced superimposed template plates mounted horizontally above said support, a block arranged between and pivotally carried by said template plates, a horizontal guide bar passing loosely through said block, cutting mechanism carried at the outer end of said guide bar and including a cutter holder engaging the edge of the lower template plate and an anti-friction means engaging the edge of the upper template plate, a cutting tool carried by said cutter holder, and means for maintaining the anti-friction means and cutter holder in yieldable engagement with the edges of the upper and lower template plates respectively.

6. In apparatus of the character described for cutting glass sheets, a horizontal support for the sheet to be cut, a pair of spaced superimposed template plates mounted horizontally above said support, a block arranged between and pivotally carried by said template plates, a horizontal guide bar passing loosely through said block, cutting mechanism carried at the outer end of said guide bar and including a cutter holder engaging the edge of the lower template plate and an anti-friction means engaging the edge of the upper template plate, a cutting tool carried by said cutter holder, and a spring encircling the guide bar and acting to draw the said bar inwardly to hold the anti-friction means and cutter holder in yieldable engagement with the edges of the upper and lower template plates respectively.

7. In apparatus of the character described for cutting glass sheets, a horizontal support for the sheet to be cut, a pair of spaced superimposed template plates mounted horizontally above said support, a block arranged between and pivotally carried by said template plates, a horizontal guide bar passing loosely through said block, a vertical sleeve passing loosely through the outer end of said guide bar, a cutter holder carried at the lower end of said sleeve and engaging the edge of the lower template plate, a rotatable steel cutting wheel carried by said cutter holder, an anti-friction device carried at the upper end of the sleeve and engaging the edge of the upper template plate, and means for maintaining the anti-friction means and cutter holder in yieldable engagement with the edges of the upper and lower template plates respectively.

8. In apparatus of the character described for cutting glass sheets, a horizontal support for the sheet to be cut, a pair of spaced superimposed template plates mounted horizontally above said support, a block arranged between and pivotally carried by said template plates, a horizontal guide bar passing loosely through said block, a vertical sleeve passing loosely through the outer end of said guide bar, a cutter holder carried at the lower end of said sleeve and engaging the edge of the lower template plate, a rotatable steel cutting wheel carried by said cutter holder, an anti-friction device carried at the upper end of the sleeve and engaging the edge of the upper template plate, and a spring encircling the guide bar and acting to draw the said bar inwardly to hold the anti-friction means and cutter holder in yieldable engagement with the edges of the upper and lower template plates respectively.

JOSEPH R. MORRIS.